United States Patent [19]
> Binkley

[11] 3,771,555
[45] Nov. 13, 1973

[54] POWER TRANSMISSION
[75] Inventor: Carl R. Binkley, Warren, Mich.
[73] Assignee: Sperry Rand Corporation, Troy, Mich.
[22] Filed: Aug. 9, 1972
[21] Appl. No.: 278,918

[52] U.S. Cl................ 137/491, 137/489.3, 137/494
[51] Int. Cl............................................. F16k 17/10
[58] Field of Search................ 137/494, 491, 489.3, 137/492.5

[56] References Cited
UNITED STATES PATENTS

| | | | |
|---|---|---|---|
| 2,155,170 | 4/1939 | Oden'hal | 137/489.3 |
| 3,129,720 | 4/1964 | Allen et al. | 137/491 X |
| 3,215,236 | 11/1965 | Pensa | 137/494 X |
| 3,265,303 | 8/1966 | Harris | 137/491 X |
| 3,578,019 | 5/1971 | Turolla | 137/491 |

Primary Examiner—Henry T. Klinksiek
Assistant Examiner—Robert J. Miller
Attorney—Theodore Van Meter

[57] ABSTRACT

A relief valve for hydraulic power transmission systems serves not only to limit the maximum system pressure, but also to limit the rate of pressure rise in the system when subjected to sudden transients which would otherwise cause large pressure overshoots before stabilizing at the designed pressure level. A self-contained cartridge is constituted by a main relief valve spool exposed to system pressure at opposite ends and carrying internally a pilot relief valve which is opened by system pressure reacting against a spring. The spring is normally set to permit valve opening at a small fraction of the designed maximum relief pressure. System pressure also reacts upon a spring loading piston of larger area which, when moved through its full stroke, brings the spring load up to the designed maximum limit. The rate of travel of this piston is regulated by a dashpot.

2 Claims, 1 Drawing Figure

Patented Nov. 13, 1973 3,771,555
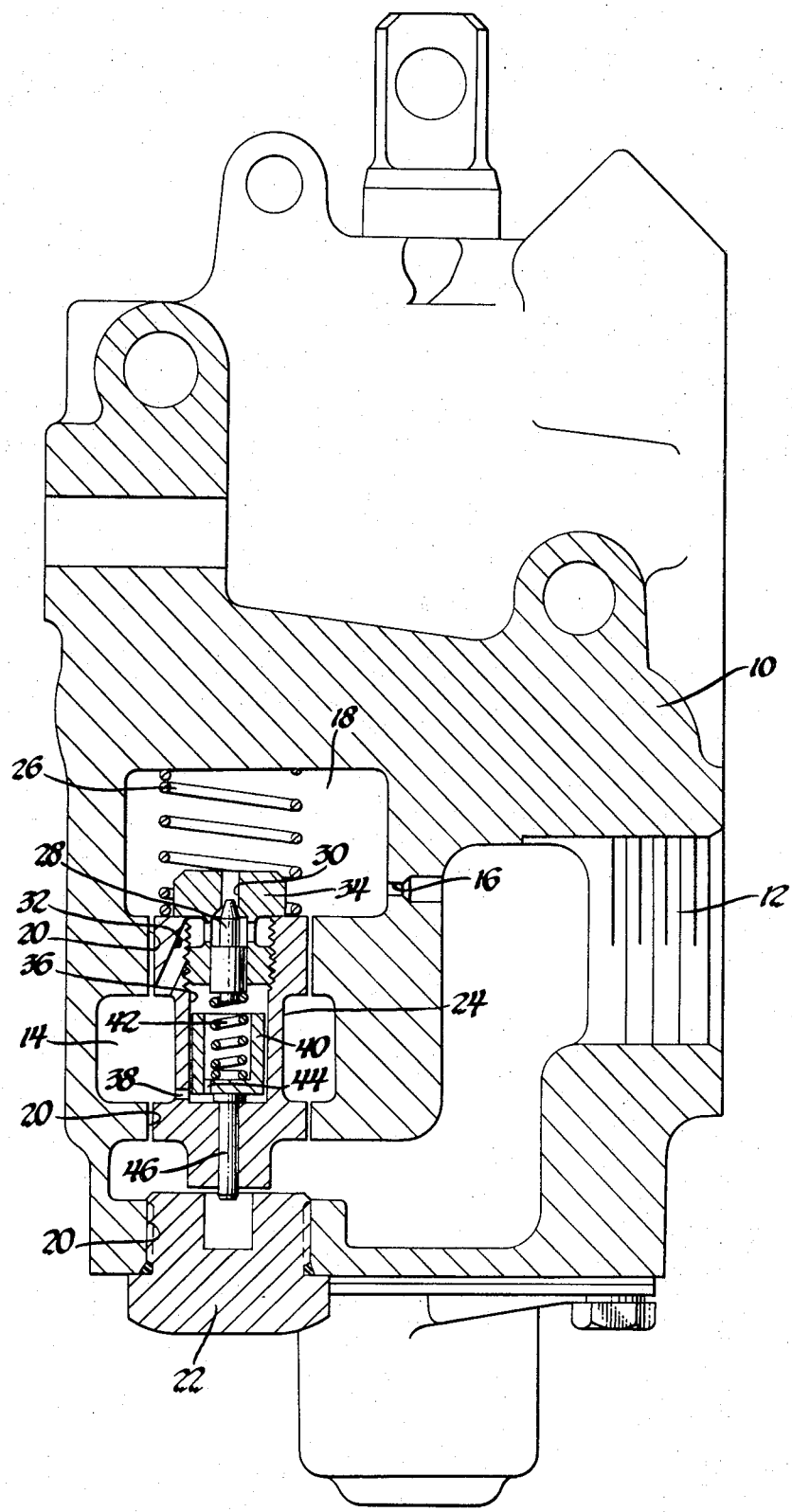

POWER TRANSMISSION

Modern hydraulic power transmission systems operate near the upper limits of pressure which can be safely accepted by the system components. Also, the valves and other controls are capable of creating very sudden transients in flow rates in the system. This requires relief valves that have a very fast response in order to prevent serious pressure overshoots. It is not uncommon with known types of relief valves to produce overshoots or pressure peaks to more than double the designed relief pressure. Such phenomenon seriously limit the design criteria and, if they could be eliminated or greatly reduced, would permit a substantial rise in the operating pressure for which a modern hydraulic power system can be designed.

In the co-pending application of Kurt R. Lonnemo et al., Ser. No. 278,919, filed 8/9/72, there is disclosed and claimed a relief valve which limits the rate of pressure rise in a system. The present invention aims to provide an improved and simplified relief valve cartridge which can perform the same function with fewer parts and at a lower cost of manufacture.

This is accomplished by providing a self-contained relief valve cartridge for controlling flow between the high pressure inlet and the low pressure outlet which is normally held closed by inlet pressure exposed to opposed areas of the cartridge but with restricted communication to the valve-closing area and which comprises an internal pilot valve exposed to pressure at the valve-closing area, a spring tending to hold the pilot valve closed, a plunger exposed directly to inlet pressure and having a slightly larger area than the pilot valve, means mechanically connecting the plunger to compress the spring increasingly as inlet pressure rises and a dashpot limiting the rate of travel of the plunger when exposed to sudden transients, whereby the rate of pressure rise in the inlet is limited by the rate of travel of the plunger in compressing the spring.

IN THE DRAWING

The single FIGURE is a diagrammatic cross sectional view of a relief valve incorporating a preferred form of the present invention.

The body 10 is illustrated in the form of an end section of a bank of directional valves, such as illustrated, for example, in the patent to Gardiner et al., U.S. Pat. No. 2,586,932, Feb. 26, 1952, for Power Transmission and, particularly, the section 18 thereof, as illustrated in FIG. 3 of the patent. This is but one of the many suitable forms of body in which the cartridge of the present invention or modification thereof may be mounted. See, for example, the patent to Vickers, U.S. Pat. No. 2,043,453, June 9, 1936, entitled Liquid Relief Valve. The body 10 has an inlet 12 for connection to the delivery side of the usual system pump and an outlet 14 which, through passages not shown, lead to the system reservoir. A restricted orifice 16 leads from the inlet 12 to a control chamber 18 which, under normal conditions when there is no flow through the orifice 16, is maintained at inlet pressure. A bore 20 intersects the inlet 12, the outlet 14, and the chamber 18 and is closed at its lower end by a plug 22.

Slidable in the bore 20 is a main relief valve cartridge 24 in the form of a spool which is normally balanced by the identical pressures in inlet 12 and chamber 18 and is urged to closed position by a spring 26. Within the cartridge 24 is a pilot relief valve 28 normally closing off passage 30 leading from chamber 18 from a passage 32 leading to the outlet 14. The relief valve 28 is mounted in a threaded cap 34 which closes an internal bore 36 in the cartridge 24. The lower end of bore 36 is exposed to outlet pressure through a passage 38. A dashpot piston 40 slides in the bore 36 and a pilot valve spring 42 extends between pilot valve 28 and piston 40. Piston 40 has a small orifice 44 extending through it. A slidable piston or plunger 46 extends through the lower end of the cartridge 24 and is exposed to inlet pressure. The area of plunger 46 is slightly larger than the seating area of pilot valve 28. In the position of the parts illustrated, spring 42 is compressed to a valve such that it would allow pilot valve 28 to open at a small fraction of designed maximum pressure as, for example, 10 percent.

In operation, starting with the parts in the position illustrated, if there were a sudden transient in the flow conditions within the system tending to cause pressure in the inlet 12 to rise extremely rapidly, the pilot relief valve 28 will at first open at the low pressure above indicated. The flow through pilot valve 28 will cause a pressure drop in restrictor 16 and the pressure in chamber 18 will lower and main relief valve spool 24 will be pushed upwardly to pass liquid directly from inlet 12 to outlet 14. The rate of upward travel of plunger 46 is determined by the area of dash-pot piston 40 and the size of orifice 44 and this, in turn, determines the rate at which spring 42 is compressed to gradually raise the pressure setting of pilot valve 28 eventually up to designed maximum pressure.

I claim:

1. A self-contained relief valve cartridge for controlling flow between a high pressure inlet and a low pressure outlet and normally held closed by inlet pressure exposed to opposed areas of the cartridge but with restricted communication to the valve closing area comprising an internal pilot valve exposed to pressure at the valve-closing area, a spring tending to hold the pilot valve closed, a plunger exposed directly to inlet pressure and having a slightly larger area than the pilot valve, means mechanically connecting the plunger to compress the spring increasingly as inlet pressure rises, and a dashpot limiting the rate of travel of the plunger when exposed to sudden transients whereby the rate of pressure rise in the inlet is limited by the rate of travel of the plunger in compressing the spring.

2. A valve cartridge as defined in claim 1 wherein the pilot valve, the spring, the plunger, and the dashpot are coaxial with the valve cartridge.

* * * * *